Patented May 9, 1950

2,506,923

UNITED STATES PATENT OFFICE 2,506,923

CONVERSION OF HYDROCARBONS WITH SILICA-ALUMINA CATALYST

James Hoekstra, Chicago, Ill., assignor to Universal Oil Products Company, Chicago, Ill., a corporation of Delaware No Drawing. Application August 16, 1946, Serial No. 691,178

2 Claims. (Cl. 196—52)

This invention relates to the conversion of hydrocarbons in the presence of a novel catalyst and to a novel method of manufacturing conversion catalysts.

Silica-alumina catalysts have been found to be very satisfactory for various hydrocarbon conversion reactions, including cracking of higher boiling oils and particularly kerosene, gas oil, fuel oil, reduced crude, topped crude, etc., for the production of gasoline, retreating of olefinic gasolines to convert the same into a product of less olefinic properties, isomerization of olefinic hydrocarbons, hydrogen transfer reactions, alkyl transfer reactions, polymerization of olefinic hydrocarbons, etc.

Catalytic cracking operations are normally effected at temperatures within the range of about 800° to about 1200° F. and more particularly within the range of about 850° to about 1050° F., at moderate superatmospheric pressures ranging from about 5 to about 50 pounds per square inch, and weight hour space velocities (defined as the weight of oil per hour per weight of catalyst in the cracking zone) of from about 0.5 to about 10 and more particularly 1 to 4.

Extensive investigations have been conducted to increase the efficiency of the catalytic cracking operation; that is, methods of obtaining higher yields of gasoline and accordingly lower yields of other products. When products other than gasoline, such as carbon, gases, etc., are formed during the catalytic cracking operation, these other products necessarily consume charging stock and therefore reduce the potential amount of gasoline obtainable from the charging stock. While the gases may usually be subjected to polymerization in order to convert them into polymer gasoline, the carbon produced is not only a total loss but also requires time and money to burn the carbon from the catalyst in order to regenerate the catalyst for further use in the process. Therefore, one of the primary purposes of the present investigation is directed to a method of reducing the carbon formation.

One method of reducing carbon formation is to effect the catalytic cracking operation at low conversions per pass and thereby to more accurately control the degree and type of cracking which occurs. However, from a practical consideration, the conversion per pass should be at least 10% and in general will be within the range of about 20 to about 60% per pass. The effluent products which will contain a large amount of unconverted charging stock may be recycled to the cracking zone for further conversion and generally the recycle oil will comprise at least two volumes thereof to one volume of fresh charging stock.

It has been found that treating synthetic silica-alumina composites in a manner to be hereinafter set forth reduces the amount of carbon formed during the catalytic cracking operation. However, while this treatment also slightly reduces the conversion per pass at the same conditions of operation, it decreases the amount of carbon to a much greater extent and this is highly advantageous for the reasons hereinbefore set forth.

In a broad aspect the present invention relates to a process for the conversion of a hydrocarbon which comprises subjecting said hydrocarbon to contact at conversion conditions with a catalyst prepared by forming a composite of silica and alumina and treating the same with hydrogen fluoride.

In a specific embodiment the present invention relates to a process for the cracking of a hydrocarbon which comprises subjecting said hydrocarbon to contact at a temperature within the range of about 800° to about 1200° F. with a catalyst prepared by treating a synthetic composite of silica and alumina with an aqueous solution of hydrogen fluoride, the amount of hydrogen fluoride not exceeding 20% by weight of said composite.

The synthetic composite of silica-alumina may be prepared in any suitable manner, including separate precipitation, successive precipitation or co-precipitation of the components. A particularly satisfactory method is to commingle waterglass and a mineral acid, particularly sulfuric acid, in amounts to precipitate silica. The precipitated silica may be washed, usually with acidulated water, to remove alkali metal ions and then may be suspended in an aqueous aluminum salt solution, particularly aluminum sulfate, aluminum chloride, aluminum nitrate, etc., the excess solution drained off, and alumina formed either by the addition of a suitable alkaline precipitating agent, particularly ammonium hydroxide, or by suitable heating as the case may require, after which the catalyst may be dried at a temperature of about 200° to about 500° F. for a period of 2 to 24 hours and then calcined at a temperature of about 900° to about 1200° F. for a period of 2 to 12 hours. In co-precipitation methods, waterglass may be commingled with an aluminum salt, particularly aluminum sulfate, in amounts to precipitate a silica-alumina composite, which may then be dried and calcined in the aforesaid manner. In general the silica will comprise a major proportion of the composite and the alumina will comprise a minor proportion thereof. Satisfactory catalysts have been prepared containing from about 5 to about 25 mols of alumina per 100 mols of silica. It is understood that the above methods of preparation represent typical examples and that silica-alumina catalysts prepared by any suitable method may be utilized within the broad scope of the present invention.

The synthetic composite may be formed into any desired size and shape. Catalysts have been used satisfactorily as granules of irregular size and shape, usually formed by grinding, or in pellets of uniform size and shape, generally formed by pelleting, extrusion or molding methods. Shaped catalysts have been produced by distributing droplets of a mixture of waterglass and acid or of a mixture of waterglass and aluminum salt, by means of a nozzle or rotating disc, into a suspending medium, particularly mineral seal oil, under conditions that the droplets set to a firm hydrogel of spherical shape during passage through the suspending medium. The catalyst may be transferred from the forming zone by means of a stream of water positioned beneath the oil bath. Spherical catalysts have also been formed by spray drying methods. The size of the catalyst particles may vary from fine powder to granules of ¼" in length or more. Particularly satisfactory catalysts comprise microspheres of about 50 to about 125 microns in diameter or larger size spheres of 1/16" to 1/8" in diameter.

In the preferred embodiment of the invention, silica-alumina composites prepared, formed into the desired shape and calcined in the manner hereinbefore set forth are treated with hydrogen fluoride. However, in some cases, it may be desirable to treat the silica-alumina composites prior to forming into the desired size and shape and/or prior to calcination.

The silica-alumina composite may advantageously be treated either by adding an aqueous solution of hydrogen fluoride to the catalyst or by adding the catalyst to an aqueous solution of the acid. The amount of water utilized should be just enough so that the solution wets the composite and that there will be no excess solution to be drained off. Treating the silica-alumina catalyst with hydrogen fluoride may be effected in a single or multiple number of steps but, in any event, the amount of hydrogen fluoride used, exclusive of water, is preferably not greater than 20% by weight of the synthetic silica-alumina composite and generally is within the range of about 5 to about 20% by weight thereof. It has been found that larger concentrations of hydrogen fluoride are not preferred for the purposes desired, as will be hereinafter set forth in detail.

When desired, anhydrous hydrogen fluoride, either in gaseous or liquid state, may be used to treat the synthetic silica-alumina composite. Treatment with gaseous hydrogen fluoride may be effected by passing the hydrogen fluoride in the desired amount into contact with the silica-alumina composite. Treatment with liquid hydrogen fluoride may be effected in a manner similar to that employed with aqueous solutions of hydrogen fluoride but the treating operation must be under sufficient pressure to maintain the hydrogen fluoride in liquid phase.

Silica-alumina catalysts treated in the manner hereinbefore set forth may be used for the conversion of hydrocarbons in any suitable type of process, including the fixed bed type of process in which a bed of catalyst is positioned within the reaction zone and the hydrocarbon charging stock is passed there-through at the desired conditions of operation, fluidized type of operation in which the catalyst and hydrocarbons are maintained in a state of turbulence under hindered settling conditions in a reaction zone under conversion conditions, compact moving bed type of process in which the hydrocarbon and catalyst are passed con-currently or counter-currently in a reaction zone maintained under conversion conditions, slurry type of operation in which the catalyst is carried as a slurry in the hydrocarbons, etc.

The following examples are introduced to further illustrate the novelty and utility of the present invention but not with the intention of unduly limiting the same.

A synthetic silica-alumina cracking catalyst was prepared by commingling sulfuric acid with waterglass at a pH controlled to precipitate silica. A solution of aluminum sulfate was added to resulting slurry and ammonium hydroxide was added to precipitate alumina. The silica-alumina composite was removed from the slurry by filtration and dried at 250° F. for 8 hours. The partially dried composite was washed with water, treated with ammonium sulfate solution and further washed with water to complete the removal of sodium ions. The washed silica-alumina composite was dried at 250° F. for 24 hours and calcined at 1112° F. for 2 hours.

Different portions of the above catalyst were treated with different amounts of hydrogen fluoride. This treatment was effected either by adding an aqueous solution of hydrogen fluoride to the catalyst or by adding the catalyst to an aqueous solution of the acid, just enough solution being used to wet the catalyst, without leaving any excess solution to be drained off. The concentration of the solution varied with the particular amounts of hydrogen fluoride treat desired. The mixture was then dried at 250° F. for 24 hours and finally calcined at 650° F. for 2 hours.

These catalysts were utilized in the cracking of Mid-Continent gas oil at a temperature of 932° F. and at a weight hourly space velocity of 4. The percent conversion (disappearance of gas oil) and the amount of carbon formed during the runs were determined and are reported in the following table.

*Table*

| Run No. | Catalyst Composition | Apparent Bulk Density | Percent Conversion | Percent Carbon | Percent Decrease in Conversion | Percent Decrease in Carbon |
|---|---|---|---|---|---|---|
| 1 | Silica-alumina | 0.61 | 33.5 | 7.20 | | |
| 2 | Above treated with 5% hydrogen fluoride | 0.59 | 33.1 | 5.70 | | 21 |
| 3 | Above treated with 10% hydrogen fluoride | 0.68 | 32.5 | 4.20 | | 42 |
| 4 | Above treated with 15% hydrogen fluoride | 0.66 | 27.4 | 1.41 | 18 | 80 |
| 5 | Above treated with 20% hydrogen fluoride | 0.62 | 21.9 | 2.75 | 35 | 62 |
| 6 | Above treated with 40% hydrogen fluoride | 0.71 | 7.1 | 0.99 | 79 | 86 |

It will be noted from the above data that there was practically no drop in conversion when using up to 10% hydrogen fluoride treatment, but that the carbon formation was decreased by 21% and 42%. When using 15% hydrogen fluoride treatment, the drop in conversion was only 18% but the amount of carbon was decreased by about 80%. When using 20% hydrogen fluoride treatment, there was a drop in conversion of 35% but a decrease in carbon formation of 62%. It is apparent that the novel features of the present invention serve to greatly decrease the carbon formation and still maintain the conversion at a level above 20%. For the reasons hereinbefore set forth, this decrease in carbon formation is of the utmost importance because it not only eliminates the necessity for burning the carbon to regenerate the catalyst, but also converts into gasoline that portion of the charging stock which otherwise would be converted to carbon.

It also will be noted from the data in the above table that treating the catalyst with 40% hydrogen fluoride decreased the conversion to 7.1% and, since this is below the conversion desired from a practical viewpoint, it is generally undesirable to utilize such high hydrogen fluoride concentrations.

I claim as my invention:

1. A process for cracking a hydrocarbon which comprises subjecting said hydrocarbon to contact at cracking conditions with a catalyst prepared by forming a synthetic composite consisting essentially of a major proportion of silica and a minor proportion of alumina, and treating said composite with hydrogen fluoride in an amount not greater than 20% by weight of said catalyst.

2. A process for cracking a hydrocarbon oil which comprises subjecting said oil to contact at a temperature of from about 800° to about 1200° F. and at a pressure not more than about 50 pounds per square inch with a catalyst prepared by forming a synthetic composite consisting essentially of a major proportion of silica and a minor proportion of alumina, and treating said composite with an aqueous solution of hydrogen fluoride, the amount of hydrogen fluoride being within the range of from about 5% to about 20% by weight of said catalyst.

JAMES HOEKSTRA.

REFERENCES CITED

The following references are of record in the file of this patent:

UNITED STATES PATENTS

| Number | Name | Date |
|---|---|---|
| 2,310,278 | Connolly | Feb. 9, 1943 |
| 2,329,307 | Thomas et al. | Sept. 14, 1943 |
| 2,331,473 | Hyman | Oct. 12, 1943 |
| 2,336,165 | Connolly | Dec. 7, 1943 |
| 2,348,624 | Hillman | May 9, 1944 |
| 2,428,741 | Plank | Oct. 7, 1947 |